United States Patent
Liang et al.

(10) Patent No.: US 10,915,778 B2
(45) Date of Patent: Feb. 9, 2021

(54) USER INTERFACE FRAMEWORK FOR MULTI-SELECTION AND OPERATION OF NON-CONSECUTIVE SEGMENTED INFORMATION

(71) Applicant: Samsung Electronics Co., Ltd., Suwon-si (KR)

(72) Inventors: Jiaxin Liang, Bound Brook, NJ (US); Manish Sharma, South Plainfield, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/113,937

(22) Filed: Aug. 27, 2018

(65) Prior Publication Data

US 2020/0065604 A1    Feb. 27, 2020

(51) Int. Cl.
| | |
|---|---|
| G06K 9/32 | (2006.01) |
| G06K 9/00 | (2006.01) |
| G06F 40/284 | (2020.01) |
| G06F 40/205 | (2020.01) |
| G06F 3/0484 | (2013.01) |
| G06F 3/0488 | (2013.01) |
| G06F 40/279 | (2020.01) |

(52) U.S. Cl.
CPC ....... *G06K 9/3258* (2013.01); *G06F 3/04842* (2013.01); *G06F 40/205* (2020.01); *G06F 40/284* (2020.01); *G06K 9/00765* (2013.01)

(58) Field of Classification Search
None
See application file for complete search history.

(56) References Cited

U.S. PATENT DOCUMENTS

| | | | |
|---|---|---|---|
| 8,688,448 B2 | 4/2014 | Peters et al. | |
| 9,129,191 B2 | 9/2015 | Cohen et al. | |
| 9,179,061 B1 * | 11/2015 | Kraft | G06Q 30/0625 |
| 9,619,123 B1 * | 4/2017 | Hughes | G06F 3/04842 |
| 2010/0203869 A1 | 8/2010 | Jeon | |
| 2012/0070085 A1 | 3/2012 | Am | |

(Continued)

FOREIGN PATENT DOCUMENTS

| | | |
|---|---|---|
| KR | 10-1049009 B1 | 7/2011 |
| KR | 10-2015-0116554 A | 10/2015 |

OTHER PUBLICATIONS

"Google Now", Wikipedia, dated Jul. 7, 2018, 5 pages. https://en.wikipedia.org/wiki/Google_Now.

(Continued)

*Primary Examiner* — Mohammed Rachedine

(57) ABSTRACT

A method, an electronic device, and computer readable medium is provided. The method includes receiving a first input associated with content displayed on a display of the electronic device. The method also includes in response to receiving the first input, identifying a type of the content, and separating the content into multiple selectable segments based on the identified content type. The method further includes receiving a second input associated with one or more of the multiple selectable segments displayed on the display. The method additionally includes identifying the one or more of the multiple selectable segments displayed on the display as selected content, based on the received second input.

20 Claims, 10 Drawing Sheets

(56) References Cited

U.S. PATENT DOCUMENTS

| | | | | |
|---|---|---|---|---|
| 2012/0072867 | A1* | 3/2012 | Schlegel | G06F 3/0481 |
| | | | | 715/808 |
| 2013/0339398 | A1* | 12/2013 | Griggs | G06F 16/211 |
| | | | | 707/803 |
| 2015/0066358 | A1* | 3/2015 | Park | A63B 57/00 |
| | | | | 701/431 |
| 2015/0089414 | A1 | 3/2015 | Park | |
| 2019/0147258 | A1* | 5/2019 | Molin | G06F 16/743 |
| | | | | 382/104 |
| 2019/0164322 | A1* | 5/2019 | Kong | G06T 7/194 |

OTHER PUBLICATIONS

Zhong, "Pin—Clipboard Extension", version 3.6.0, dated Jul. 20, 2018, 3 pages. https://itunes.apple.com/cn/app/pin-clipboard-extension/id1039643846?l=en&mt=8.

"Smartisan OS 3.0 / 3.1", Smartisan Digital Co., Ltd., copyright 2018, 10 pages. https://www.smartisan.com/en/m1#/os.

Grasso, "People are wildin' over Snapchat's new Scissors tool", The Daily Dot, Dec. 14, 2016, 8 pages. https://www.dailydot.com/debug/how-to-use-snapchat-scissors/.

Brown, "Split Your Video into Sub Clips with Auto Scene Detection", Wondershare, May 30, 2018, 12 pages. https://filmora.wondershare.com/video-editing-tips/scene-detection.html.

"Marker-Controlled Watershed Segmentation", MathWorks, copyright 1994-2018, 16 pages. https://www.mathworks.com/help/images/examples/marker-controlled-watershed-segmentation.html#d119e3597.

"Adjust pixel selections" Adobe Systems Incorporated, Feb. 15, 2017, 13 pages. https://helpx.adobe.com/photoshop/using/adjusting-pixel-selections.html#refine_selection_edges.

Alemi et al., "Text Segmentation based on Semantic Word Embeddings", arXiv preprint arXiv:1503.05543, Mar. 2015, 10 pages.

International Search Report dated Dec. 24, 2019 in connection with International Patent Application No. PCT/KR2019/010822, 3 pages.

Written Opinion of the International Searching Authority dated Dec. 24, 2019 in connection with International Patent Application No. PCT/KR2019/010822, 5 pages.

Patel, "Google Lens: real-time answers to questions about the world around you," May 8, 2018, 4 pages. See animations of images that show user interactions with mobile device at: https://www.blog.google/products/google-lens/google-lens-real-time-answers-questions-about-world-around-you/.

* cited by examiner

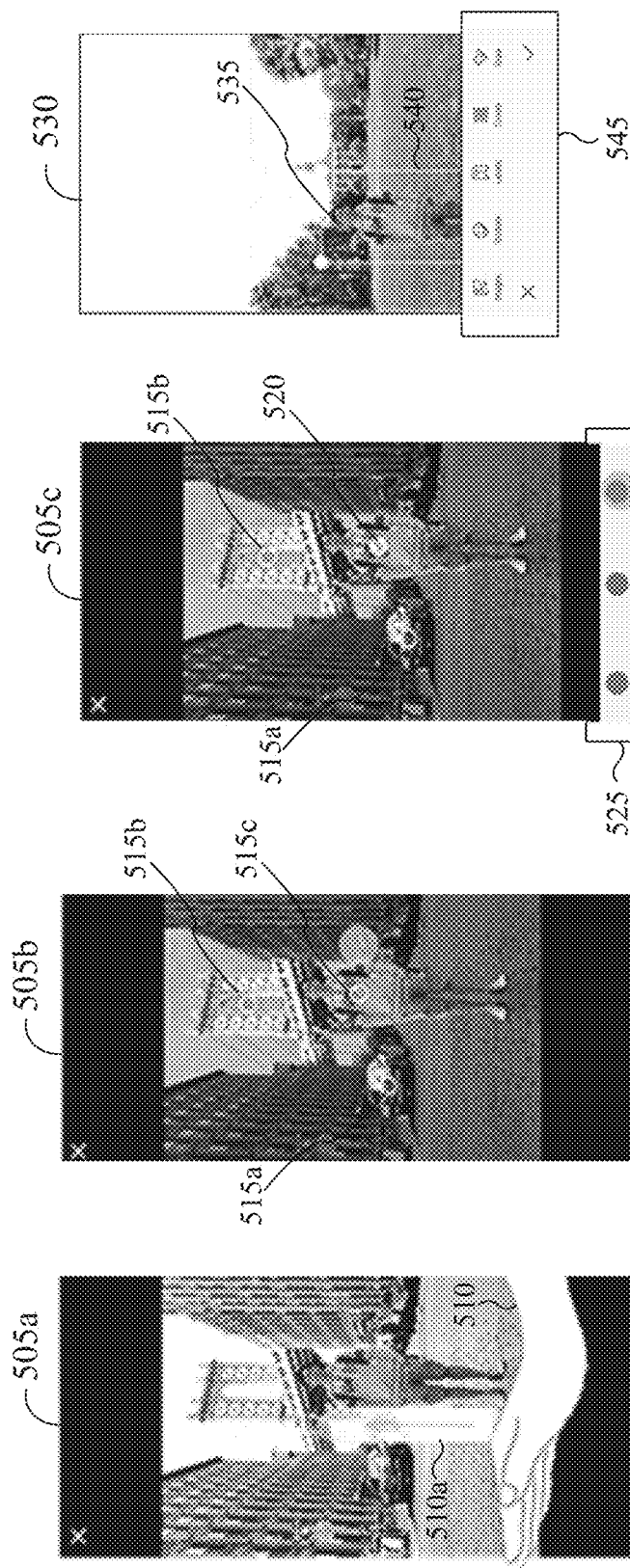

USER INTERFACE FRAMEWORK FOR MULTI-SELECTION AND OPERATION OF NON-CONSECUTIVE SEGMENTED INFORMATION

TECHNICAL FIELD

This disclosure relates generally to an electronic computing device including a graphical user interface. More specifically, this disclosure relates to a method and system to separate content into multiple selectable segments.

BACKGROUND

The use of mobile computing technology such as a portable electronic device has greatly expanded largely due to their usability, convenience, computing power, and the like. One result of the recent technological development is that electronic devices are becoming more compact, while the number of functions performed by a given device, such as features of the electronic device, is increasing. For example, certain electronic devices not only provide voice call services using a mobile communication network, but can also offer video call, messaging services, data transmission service, multimedia services, and the like. With the rise of mobile computing technology, a user can interact with various types of information and content provided on a display of the electronic device.

SUMMARY

This disclosure provides user interface framework for multi-selection and operation of non-consecutive segmented information.

In one embodiment, an electronic device is provided. The electronic device includes a display and a processor. The processor is operably connected to the display. The processor is configured to receive a first input associated with content displayed on the display of the electronic device. In response to receiving the first input, the processor is configured to identify a type of the content and separate the content into multiple selectable segments based on the identified content type. The processor is also configured to receive a second input associated with one or more of the multiple selectable segments displayed on the display. The processor is further configured to identify the one or more of the multiple selectable segments displayed on the display as selected content, based on the received second input.

In another embodiment, a method for operating an electronic device is provided. The method includes receiving a first input associated with content displayed on a display of the electronic device. In response to receiving the first input, The method also includes identifying a type of the content, and separating the content into multiple selectable segments based on the identified content type. The method further includes receiving a second input associated with one or more of the multiple selectable segments displayed on the display. The method additionally includes identifying the one or more of the multiple selectable segments displayed on the display as selected content, based on the received second input.

In yet another embodiment a non-transitory computer readable medium embodying a computer program is provided. The computer program includes computer readable program code that, when executed by a processor of an electronic device, causes the processor to: receive a first input associated with content displayed on a display of the electronic device; in response to receiving the first input, identify a type of the content and separate the content into multiple selectable segments based on the identified content type; receive a second input associated with one or more of the multiple selectable segments displayed on the display; and identify the one or more of the multiple selectable segments displayed on the display as selected content, based on the received second input.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A, 5B, 5C, and 5D illustrate an example diagrams for segmenting an image in accordance with an embodiment of this disclosure;

DETAILED DESCRIPTION

Figure 1:
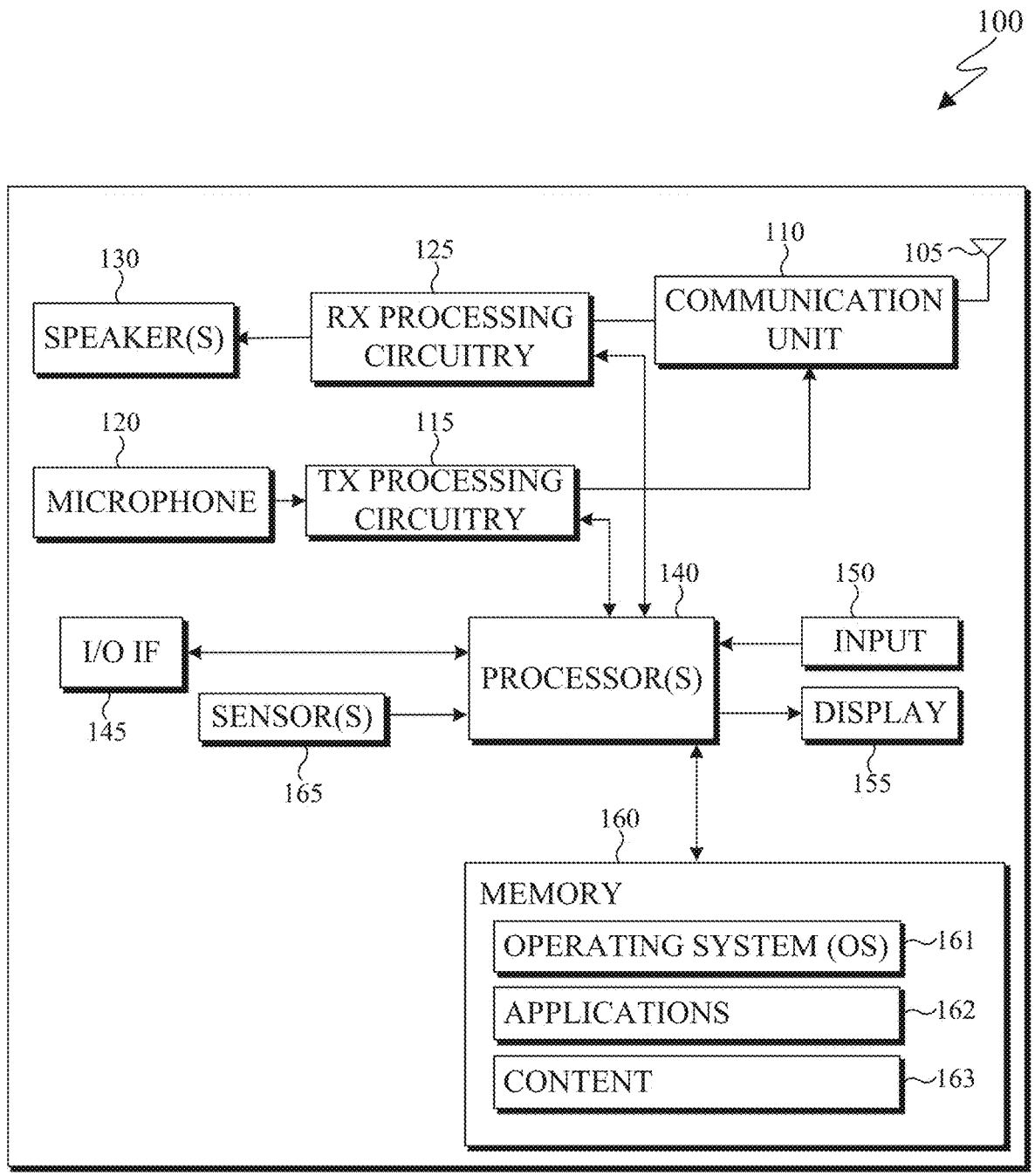
FIG. 1 illustrates an example electronic device in accordance with an embodiment of this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Certain electronic devices include a graphical user interface (GUI) such as a display that allows a user to view information displayed on the display in order to interact with the electronic device. Electronic devices can also include a user input device, such as keyboard, a mouse, a touchpad, among others. The user various types of input devices allow a user to interact with the electronic device. Various electronic devices can also include a user input device that is a touch screen panels, and used in combination with the GUI. Touch screens allow a user to interact with the electronic device via touching the display screen itself. For example, if a user touches text, graphics, multimedia content, or icons displayed on the touch screen with a finger or stylus, the electronic device detects the selection of the user based on the location, situation, and type of touch.

According to embodiments of the present disclosure, content displayed on a display screen of an electronic device can include user interface objects and information such as text, images video, other multimedia content, icons, control elements such as buttons and other graphics, and the like. In certain embodiments, content can also include audio projected from a speaker and represented on a display of an electronic device. In certain embodiments, content can also include live video, live-audio, and a simulation. A user can interact with the content via a user input device, such as a keyboard, mouse, and a touchpad. If the display includes a touch panel, such as a touchscreen display, a user can interact with the content displayed on the electronic device by simply touching the display via a finger of the user or a stylus. A user can interact with one or more of the types of content displayed on the display screen. For example, a user can select an image to view the image or to perform another operation associated with the image, such as edit the image, send the image to another computing device, and the like. In another example, a user can select a portion of text. That is, a user can select a portion or all of a text in order to perform an operation with the text such as, copy the text, activate a translator that converts the text to another language, and the like. It is noted that as used herein, the term "user" may denote a human or another device (e.g., an artificial intelligent electronic device) using the electronic device.

An electronic device, according to embodiments of the present disclosure, can include personal computers (such as a laptop, a desktop), a workstation, a servers a television, an appliance, and the like. Additionally, the electronic device can be at least one of a part of a piece of furniture or building/structure, an electronic board, an electronic signature receiving device, a projector, or a measurement device. In certain embodiments, an electronic device can be a portable electronic device such as a portable communication device (such as a smartphone or mobile phone), a laptop, a tablet, an electronic book reader (such as an e-reader), a personal digital assistants (PDAs), portable multimedia players (PMPs), MP3 players, mobile medical devices, virtual reality headsets, portable game consoles, cameras, and wearable devices, among others. The electronic device is one or a combination of the above-listed devices. Additionally, the electronic device as disclosed herein is not limited to the above-listed devices, and can include new electronic devices depending on the development of technology.

Various programs and applications associated with mobile computing and electronic devices are designed specifically for certain types of electronic devices, such as tablets, personal computers, smart phones, and the like. For example, an application is a program that runs on certain electronic devices. Applications can include an icon that is used for lunching the application and provides a condensed image that provides an indication to the user of the electronic device the particular application. When an application is launched, the application displays various types of content to a user. After displaying content to a user, if the electronic device receives a certain input associated with the displayed content, the displayed content can be selected.

Embodiments of the present disclosure recognize and take into consideration that, selecting content displayed on a display can be difficult for a user. A user can select content displayed on a display via a touch input, a key board, a mouse, a touch pad, or any other input technique. A user of an electronic device selects content in order to perform an operation on the content such as, edit the content, copy the content, send or share the content to another program on the electronic device, send or share the content to an external electronic device over wired or wireless communication, convert the content into another format, and the like. For example, if the content is text, it can be difficult for the user to select a particular portion of text. Selecting a portion of text can include providing an input indicating where the text starts and ends on the display. Selecting the start and end of text is limited to the control and accuracy of an input provided by a user. Moreover, selecting non-consecutive words that are included in a larger portion of text can be even more difficult for the user and multiple inputs can be required to perform the selection.

In another example, embodiments of the present disclosure recognize and take into consideration that, it can be difficult for a user to select a portion multi-media content. For instance, if the content is an image, it can be difficult for the user to select a portion of the image instead of the entirety of the image. It can also be difficult for a user to select multiple objects within an image, in order to perform an operation associated with the multiple selected objects from a single image. In another example, if the content is a video, it can be difficult for the user to select a portion of the video. For instance it can be difficult for a user to select a single scene of the video. It can also be difficult for a user to select two or more non-consecutive portions of the video. Manually selecting a non-consecutive video clips or an unconnected portion of an image can be inconvenient for the user. That is, selecting a non-consecutive video clips or portions of an image often require video editing or image editing software. Video editing software and image editing can enable a user to select a portion of an image or a portion of a video, respectively. However, video and image editing software often drain resources or require a user to open another program to extract a portion of an image of a video, or a combination thereof. If the content is an audio clip, it can be difficult for the user to select a portion of the audio clip. An audio clip is projected through a speaker associated with the electronic device, and can be projected and can include a pictorial representation of the audio on displayed on the display. Additionally, there is a lack of uniformity for a user to select a portion of the content of, irrespective of the type of content (such as text, images, video, audio, and the like).

Embodiments of the present disclosure include systems and methods for splitting digital content into multiple selectable segments. A segment is the portion of content that is separated into multiple fragments. Splitting content can be based on the type of content. For example, text is different than an image, which is different than a video, which is different than audio.

Embodiments of the present disclosure also provide systems and methods for selecting non-connective portions of content. Embodiments of the present disclosure separate content into multiple selectable segments based on the type of content. Separating the content into multiple segments enables a user to select multiple fragments of different kinds of content, regardless of whether the selected content is consecutive or non-consecutive. Segments of the content can then be selected, regardless of whether the segments are selected in a consecutive or non-consecutive order. The segments of content can be selected in order for further operations to be performed thereon. Embodiments of the present disclosure also provide systems and methods to determine one or more operations to perform on the selected content.

Consecutive content is content that is sequential in a spatial dimension or a temporal dimension. In certain embodiments, content is segmented in a spatial dimension, such as text or an image. For example, content in the spatial dimension can represent the order of words within a body of text. A word is a portion of a paragraph. In another example, content in the spatial dimension can also represent spatial positioning of objects that compose an image. A collection of pixels is a portion of an image. In certain embodiments, content is segmented in a temporal dimension such as audio or a video. A video clip is a portion of a pre-recorded or live-streamed video. An audio clip is a portion of an audio file or live-streamed audio. A continuous set frame is a portion of a simulation. A temporal dimension represents the order of frames in a video, based on time. That is, frames in a video are sequentially order based on time.

Therefore, embodiments of the present disclosure provide systems and methods for direct manipulation of a type of content in any order, such as consecutive or non-consecutive order. For example, if the content is text, any non-consecutive portion of text can be selected. The non-consecutive portion of text can be selected in any order. In another example, if the content is an image, any portion or portions of the image can be selected. Similarly, if the content is a video, one or more non-consecutive segment of the video can be selected. The non-consecutive segments of the video can be selected in any order.

FIG. 1 illustrates an electronic device 100 in accordance with an embodiment of this disclosure. The embodiment of the electronic device 100 shown in FIG. 1 is for illustration only and other embodiments could be used without departing from the scope of this disclosure. The electronic device 100 can come in a wide variety of configurations, and FIG. 1 does not limit the scope of this disclosure to any particular implementation of an electronic device.

The electronic device 100 can be a mobile communication device, such as, for example, a mobile station, a subscriber station, a wireless terminal, a desktop computer, a portable electronic device such as a mobile device, a PDA, a laptop computer, a tablet computer, a wearable device, and the like. In certain embodiments, the electronic device 100 is a smart phone that includes a GUI that and one or more applications or programs installed thereon.

As shown in FIG. 1, the electronic device 100 includes an antenna 105, a communication unit 110, a transmit (TX) processing circuitry 115, a microphone 120, and a receive (RX) processing circuitry 125. The communication unit 110 can include, for example, a RF transceiver, a BLUETOOTH transceiver, a WI-FI transceiver, ZIGBEE, infrared, and the like. The electronic device 100 also includes a speaker 130, a processor 140, an input/output (I/O) interface (IF) 145, an input 150, a display 155, a memory 160, and a sensor(s) 165. The memory 160 includes an operating system (OS) 161, one or more applications 162, and content 163.

The communication unit 110 receives, from the antenna 105, an incoming RF signal transmitted such as a BLUETOOTH or WI-FI signal from an access point (such as a base station, WI-FI router, BLUETOOTH device) of a network (such as a WI-FI, Bluetooth, cellular, 5G, LTE, LTE-A, WiMAX, or any other type of wireless network). The communication unit 110 down-converts the incoming RF signal to generate an intermediate frequency or baseband signal. The intermediate frequency or baseband signal is sent to the RX processing circuitry 125 that generates a processed baseband signal by filtering, decoding, or digitizing the baseband or intermediate frequency signal, or a combination thereof. The RX processing circuitry 125 transmits the processed baseband signal to the speaker 130 (such as for voice data) or to the processor 140 for further processing (such as for web browsing data and remittance).

The TX processing circuitry 115 receives analog or digital voice data from the microphone 120 or other outgoing baseband data from the processor 140. The outgoing baseband data can include web data, e-mail, or interactive video game data. The TX processing circuitry 115 encodes, multiplexes, digitizes, or a combination thereof, the outgoing baseband data to generate a processed baseband or intermediate frequency signal. The communication unit 110 receives the outgoing processed baseband or intermediate frequency signal from the TX processing circuitry 115 and up-converts the baseband or intermediate frequency signal to an RF signal that is transmitted via the antenna 105.

The processor 140 can include one or more processors or other processing devices and execute the OS 161 stored in the memory 160 in order to control the overall operation of the electronic device 100. For example, the processor 140 could control the reception of forward channel signals and the transmission of reverse channel signals by the communication unit 110, the RX processing circuitry 125, and the TX processing circuitry 115 in accordance with well-known principles. The processor 140 is also capable of executing other applications 162 resident in the memory 160, such as one or more applications that include content 163 that is displayed on the display 155. Example, applications 162 include business, calendars, email clients, finance, games, health/fitness, maps/navigation, photography, shopping, travel, utilities, weather, messaging, web browsing, video player, image view, and the like.

Applications 162 can be a repository for multiple applications that are accessible by the electronic device 100. In certain embodiments, one or more applications or programs installed on the electronic device 100. Each of the applications installed on the electronic device 100 can be stored in a locally or remotely. For example, an application can be stored in a memory, such as memory 160 (such as applications 162) or located remotely and accessed via the communication unit 110. The applications installed on the electronic device 100 can access one or more features of the electronic device.

The processor 140 can execute instructions that are stored in a memory 160. The processor 140 can include any suitable number(s) and type(s) of processors or other devices in any suitable arrangement. For example, in some embodiments, the processor 140 includes at least one microprocessor or microcontroller. Example types of processor 140 include microprocessors, microcontrollers, digital signal processors, field programmable gate arrays, application specific integrated circuits, and discreet circuitry The processor 140 is also capable of executing other processes and programs resident in the memory 160, such as operations that receive, store, and timely instruct by providing image capturing and processing. The processor 140 can move data into or out of the memory 160 as required by an executing process. In some embodiments, the processor 140 is configured to execute plurality of applications 162 based on the OS 161 or in response to signals received from eNBs or an operator. The processor 140 is also coupled to the I/O interface 145 that provides the electronic device 100 with the ability to connect to other devices. For example, the electronic device can connect to and receive applications, such as applications 162, from an external device such as a server that contains a repository of applications. The I/O interface 145 is the communication path between these accessories and the processor 140.

The processor 140 is also coupled to the input 150 and the display 155. The operator of the electronic device 100 can use the input 150 to enter data or inputs into the electronic device 100. Input 150 can be a keyboard, touch screen, mouse, track ball, voice input, or other device capable of acting as a user interface to allow a user in interact with electronic device 100. For example, the input 150 can include voice recognition processing thereby allowing a user to input a voice command. In another example, the input 150 can be a gaze detection by a camera directed at an eye of the user. For another example, the input 150 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. Input 150 can be associated with sensor(s) 165 and/or a camera by providing additional input to processor 140. The input 150 can also include a control circuit. In the capacitive scheme, the input 150 can recognize touch or proximity. The display 155 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 160 is coupled to the processor 140. Part of the memory 160 could include a random access memory (RAM), and another part of the memory 160 could include a Flash memory or other read-only memory (ROM).

The memory 160 can include persistent storage (not shown) that represents any structure(s) capable of storing and facilitating retrieval of information (such as data, program code, and/or other suitable information on a temporary or permanent basis). The memory 160 can contain one or more components or devices supporting longer-term storage of data, such as a ready only memory, hard drive, Flash memory, or optical disc.

The memory 160 also can contain content 163. The content 163 can include text, images, video, audio, a simulation, and the like. In certain embodiments, the processor 140 causes the content 163 to be displayed on the display 155 of the electronic device 100. The processor 140 allows a user input to select a portion of the content. For example, if the content is text, the user input can select non-consecutive portions of the text. In another example, if the content is an image, the user input can select one or more detected objects within the image. For example, if the content is a video, the user input can select non-consecutive segments of the video.

Electronic device 100 further includes one or more sensor(s) 165 that can meter a physical quantity or detect an activation state of the electronic device 100 and convert metered or detected information into an electrical signal. For example, sensor 165 can include one or more buttons for touch input, a camera, an optical sensor, a gesture sensor, an inertial/motion sensors (such as a gyroscope or gyro sensor and an accelerometer), an air pressure sensor, a magnetic sensor or magnetometer, a grip sensor, a proximity sensor, altimeter, a color sensor, a bio-physical sensor (such as a heart rate sensor), a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, an iris sensor, a fingerprint sensor, and the like. The sensor 165 can further include a control circuit for controlling at least one of the sensors included therein. Any of these sensor(s) 165 can be located within the electronic device 100.

Although FIG. 1 illustrates examples of devices in a computing system, various changes can be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). In addition, as with computing and communication networks, electronic devices and servers can come in a wide variety of configurations and FIG. 1 does not limit this disclosure to any particular electronic device or server.

Figure 2:
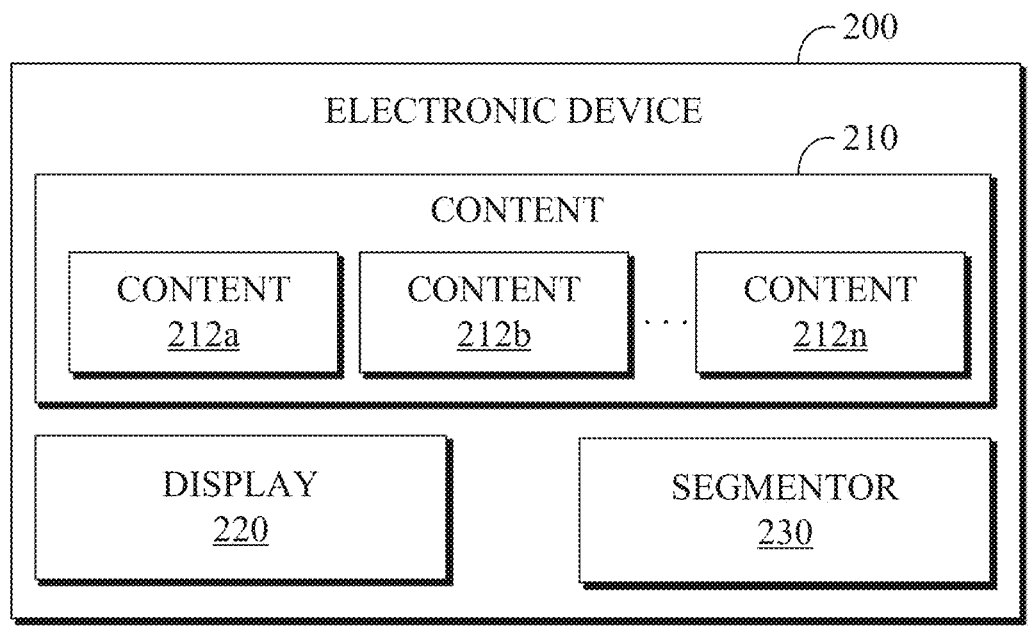
FIG. 2 illustrates an example block diagram in accordance with an embodiment of this disclosure.

FIG. 2 illustrates an example block diagram of an electronic device 200 in accordance with an embodiment of this disclosure. The embodiment of the electronic device 200 shown in FIG. 2 is for illustration only. Other embodiments can be used without departing from the scope of the present disclosure.

Electronic device 200 illustrates a high-level overview of an embodiment of the present disclosure. Electronic device 200 can generate a cluster of applications and modify features of the applications within the generated cluster. Electronic device 200 can include internal components similar to the electronic device 100 of FIG. 1. In certain embodiments, the electronic device 200 is similar to a smart phone, a head mounted display, a wearable device, a desktop computer, a laptop computer, a tablet computer, and the like. Additional examples of the electronic device 200 includes a cellular phone, a PDA, an image sensing device such as a digital camera, a gaming device, a music storage and playback device, a household appliance capable of wireless Internet access and web browsing, and a portable unit or terminal integrating the functions of the aforementioned items. The electronic device 200 includes content 210, a display 220 and a segmentor 230.

In certain embodiments, electronic device 200 is connected to one or more servers to download and receive applications, notifications, information, content, and the like. For example, electronic device 200 can include components to allow the electronic device 200 to access one or more networks. Electronic device 200 can access networks in order to acquire an application from one or more application manufacturers or developers. Electronic device 200 can access another electronic device to share content. The network can be personal area network (PAN), Local Area Networks (LANs), Wireless Local Area Networks (WLANs), the Internet, the Public Switched Telephone Network (PSTN), as well as other wireless networks. The network may also be the Internet representing a worldwide collection of networks and gateways that use Transmission Control Protocol/Internet Protocol (TCP/IP) protocols to communicate with one another. The network can include a cable, a router, switches a firewall, or a combination thereof. The network can include a variety of connections, such as, wired, wireless or fiber optic connections.

Content 210 can be similar to the content 163 of FIG. 1. Content 210 includes a variety of types of content such as content 212a, content 212b, through content 212n (collectively content 212a-212n). Each type of content 210, such as content 212a-212n can be presented to the user in different forms. For example, certain types of content can be displayed on a display (such as display 155 of FIG. 1 and display 220) to the user. Content 212a can be text, while content 212b is a video, and content 212n is an image each of which can be displayed on the display 220. In another example, another type of content can be an audio clip that is played to the user on a speaker. Additional types of content can include simulations, virtual reality, augmented reality, and a live stream of audio or video. Certain types of content, such as a video, include both an image component and an audio component. Each of the types of content 212a-212n can represent content that the electronic device 200 can present to the user via a display, a speaker, a projector, and the like. In certain embodiments, the content 212a-212n represents different types of content the electronic device 200 can present to the user. In certain embodiments, the content 212a-212n can represent the same or different types of content that are presented to the user at a given instant. For example, if the user is viewing a web page, the content 212a-212n can represent the multiple sections of text, and multiple images.

The display 220 is similar to display 155 of FIG. 1. In certain embodiments, the display 220 is a standalone display separate from the electronic device 200. In certain embodiments, the display 220 is affixed to and part of the electronic device 200. The display 220 can be similar to a display screen on mobile device, or a display screen on a computer or tablet. Content 212a-212n can be displayed on the display 220.

In certain embodiments, display 220 is a user interface allowing the user to provide one or more inputs with respect to the content 212a-212n. By displaying a user interface on the display 220, a user is able to input particular instructions regarding the content 212a-212n. Each of the content 212a-212n can be interacted with by a user through a user interface. In certain embodiments, the user interface is a GUI that includes the display 220. The user interface allows a user the ability to interact with the various functionalities provided by the electronic device 200 such as taking a picture, making a phone call, word processing, drafting text such as in an email, reading text such as on a web browser, playing games, selecting music or a video to be played, and the like. The display 220 can include a touchscreen that allows a user to directly interact with the electronic device 200 via a finger of the user or a stylus. The input can be received from a touch screen or a user input device such as a mouse, keyboard or any other input similar to input 150 of FIG. 1. For example, when a user provides a certain input with respect to a particular piece of content (such as content 212a), the content 212a or a portion of the content can be selected.

In certain embodiments, the segmentor 230 identifies the type of content 210 that is displayed on the display. For example, the segmentor 230 identifies whether the content 210 on the display is an image (such as content 212a), text (such as content 212b), a video (such as content 212c), a simulation (such as content 212d), or the like. In another example, the segmentor 230 identifies whether the content 210 is audio (such as content 212e) that is projected from a speaker (similar to speaker 130 of FIG. 1) associated with the electronic device 200. The segmentor 230 can identify the type of content 210 based on metadata associated with the content. The segmentor 230 can distinguish between text displayed on a screen (such as text within an email or a web page) and an image that includes text such as a picture of a book that includes text or a picture that includes a street sign with a named street or retail facility. In certain embodiments, the segmentor 230 can include or access an optical character recognition that converts text from an image to characters of text, that are selectable.

The segmentor 230 can categorize the content 210 based on type. For example, the segmentor 230 can categorize content 210 as text, an image, a video, audio, and simulations including both virtual and augmented reality. Base on the identified type the segmentor decides how to segment the content 210 and the various operations that are available to be performed on the content 210. In certain embodiments, if the content is a live stream or simulation, the segmentor 230 can include a sequence loop into the interaction framework between selecting the segments and presenting the operations to be performed with respect to the content.

In certain embodiments, the segmentor 230 separates the content 210 into selectable segments. The segmentor 230 separates the content 210 into multiple segments or portions based on the identified type. For example, if the content 210 is a set of text, the individual words of the text are separated and formed into individual selectable segments. The text can be selected in a non-sequential or non-consecutive order. In another example, if the content 210 is an image, various objects that comprise the image can be selected and separated from the image. In another example, if the content 210 is a video, various scenes, or portions of the video can be separated and formed into individual selectable segments. The video segments can be selected in a non-sequential or non-consecutive order. In another example, if the content 210 is an audio that can be played by a speaker, various portions of sound can be separated and formed into individual selectable segments. The various audio segments can be selected by a user in a non-sequential or non-consecutive order.

The segmentor 230 can also create a single segment of text that includes two or more words. For example, in response to identifying the content is text, the segmentor 230 detects whether two or more consecutive words of the text remain together. That is, the segmentor 230 can identify particular structure that is associated with the text and determine to keep certain consecutive words together. For example, formatting that is associated with the text indicates that certain words remain together such as a date, a time, a phone number, an address, an email address, a uniform resource locator (URL) such as a web address, a measurement (that includes a number and a unit of measure), and the like. In another example, the segmentor 230 can identify a proper noun and determine to keep consecutive words of a proper noun together. Proper nouns can include a first and last name of a person, a movie name, a name of a show, a name of a band, a city, a geographic location, a name of a business or institution, and the like.

In certain embodiments, the segmentor 230 can identify a user input that selects one or more of the selectable segments. After the segmentor 230 separates the content 210 into selectable segments, the selectable segments can be displayed on the display 220. In certain instances, a representation of the various selectable segments is displayed on the display 220. For example, audio such as sound is not able to be displayed; however an icon representing a segmented sound bite can be displayed on the display 220. In another example, a video includes multiple frames or still images that when viewed in a chronological order, represent moving visual images. The segments of a video can be represented by icons, depicting a still image or a reduced version of the video such as a predetermined number of frames that portray the content 210 of each video segment.

A user can provide an input that selects one or more segments of the content 210. The selection of the segments can occur in any order. For example, when multiple segments are selected, the segmentor 230 identifies the order that each segment is selected. The order of the selected segments can be utilized based on the operation that is performed with respect to the selected segments. The selected segments can be selected consecutively. That is, in a section of text, consecutive text indicates the sequence of words in the text. Consecutive segments of a video encompass the chronological sequence of frames from start to finish of the video.

The selected segments can be selected non-consecutively. That is, in a section of text, selecting non-consecutive text is the selection of words that are not in sequence. Non-consecutive segments of a video include segments that due not occur in chronological order. Similarly, non-consecutive segments of an image can include portions of pixels that are not continuous with each other.

In certain embodiments, the segmentor 230 determines one or more actions that can be performed to the selected content 210 displayed on the display 220. In response to receiving an input hat selects one or more segments of the content 210, the segmentor 230 can identify various functions that can be performed with respect to the selected content 210. Based on the type of content 210, the segmentor 230 can suggest one or more types of actions that can be performed with respect to the selected content 210. In certain embodiments, the segmentor determines to perform a particular operation without user input based on historical data of previous user inputs with respect to similar types of content 210.

For example, if the content 210 is text, the segmentor 230 can suggest copying the text, sharing the text with another application on the electronic device 200. Additionally, the segmentor 230 can perform an internet search for the selected text. The segmentor 230 can activate another program such as a translator to translate the selected text. In certain embodiments, the segmentor 230 can identify a specialized format of text such as a calendar entry, and create a calendar notification that is associated with the selected text. The segmentor 230 can identify a specialized format of text such a phone number, and create a contact in a contact list or activate a phone feature of the electronic device 200. The segmentor 230 can identify a specialized format that includes an address and through location services such as, a global positioning system (GPS) associated with the electronic device input the address for direction and navigation purposes.

In another example, if the content 210 is a video, the segmentor 230 can suggest copying the segments, sharing the segments with another application of the electronic device 200, transmitting the segment to another electronic device, creating a new video from the selected segments, converting the segments into a different format such as a graphics interchange format (GIF), and the like.

Figure 3A:
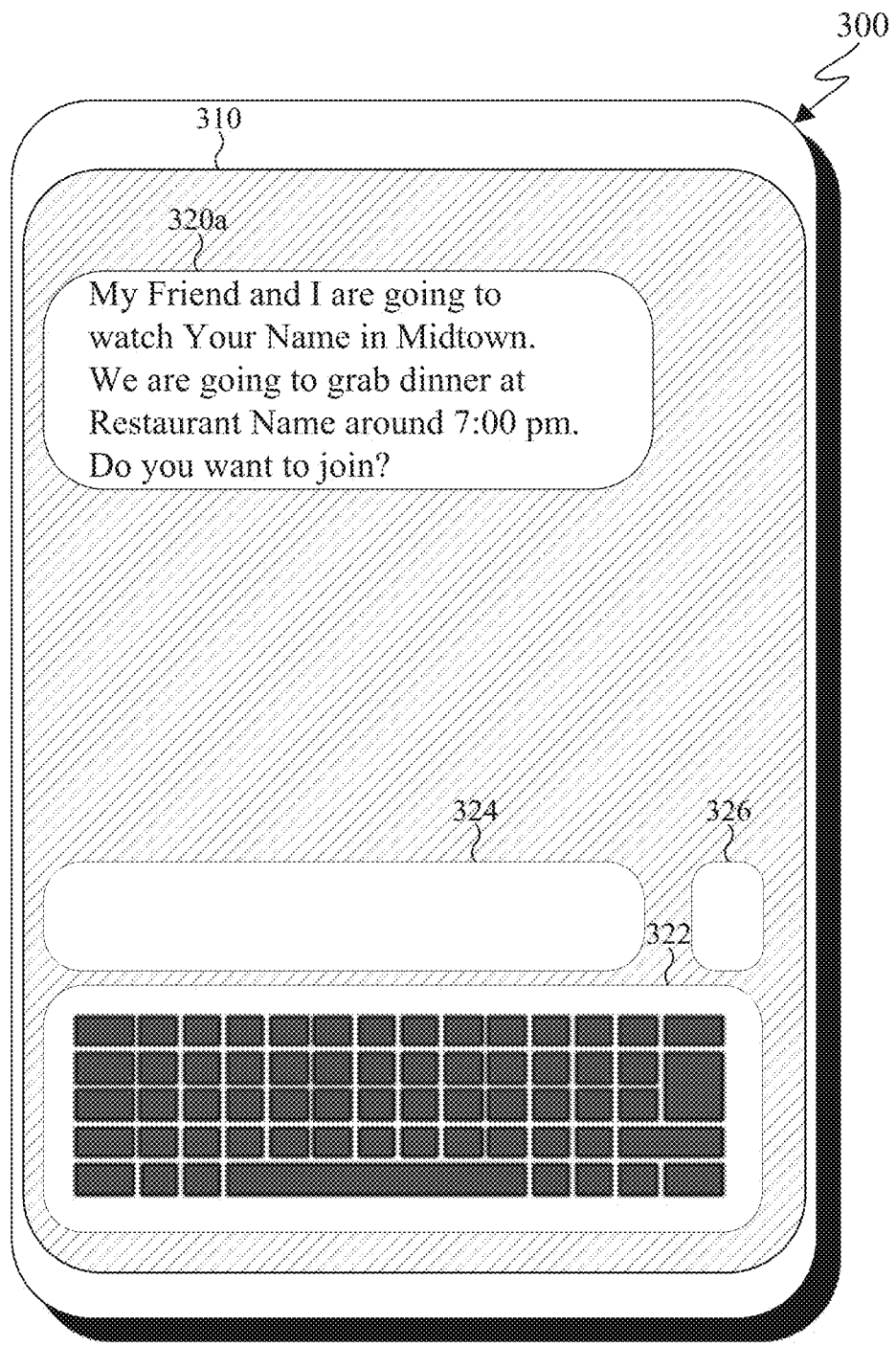
FIGS. 3A, 3B, and 3C illustrate an example electronic device for segmenting text in accordance with an embodiment of this disclosure.
Figure 3B:
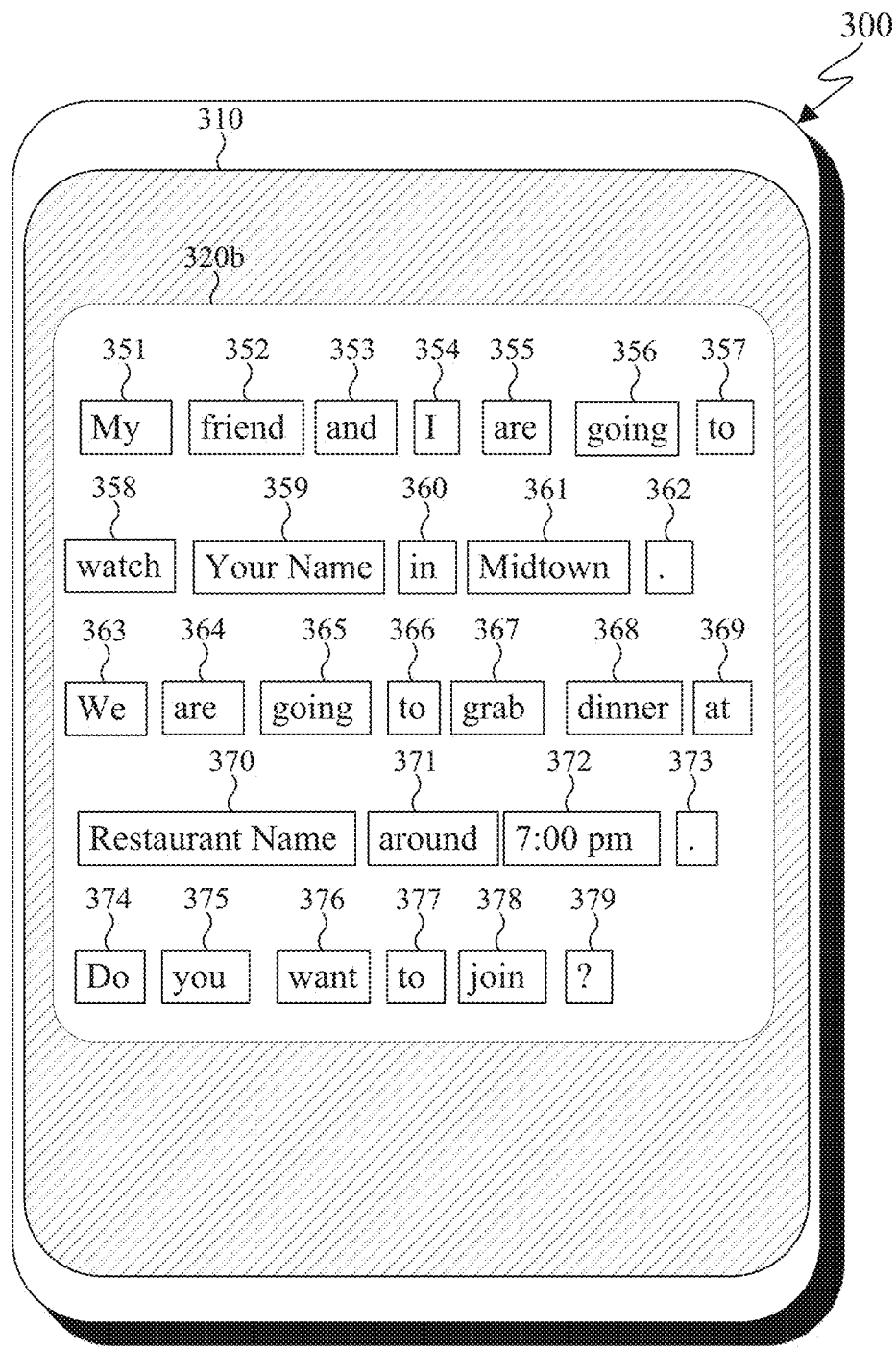
Figure 3C:
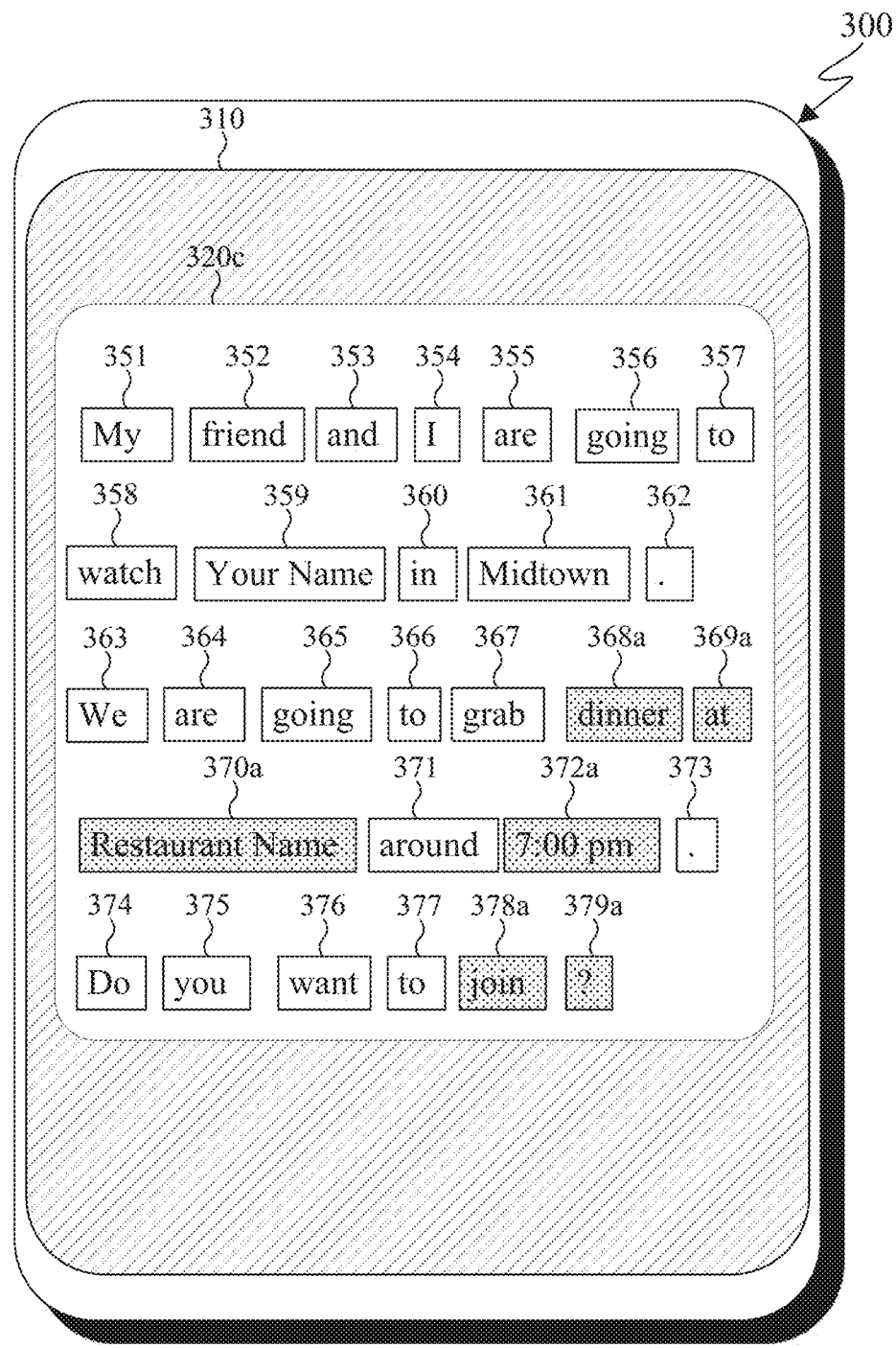

FIGS. 3A, 3B, and 3C illustrate an example electronic device 300 for segmenting text in accordance with an embodiment of this disclosure. The electronic device 300 can be similar to the electronic device 200 of FIG. 2 and can include internal components similar to the electronic device 100 of FIG. 1. The embodiment of the electronic device 300 shown in FIG. 3 is for illustration only. Other embodiments can be used without departing from the scope of the present disclosure.

FIG. 3A illustrates an example electronic device 300 displaying a messaging application and a message 320a in accordance with an embodiment of this disclosure. The electronic device 300 includes a display 310, which can be similar to the display 220 of FIG. 2 and the display 155 of FIG. 1. The display 310 displays a message 320a containing text similar to that of a message such as a short message service (SMS). The electronic device 300 could have sent or received the message. The display 310 is a touch screen and depicts a keyboard 322 a message preview 324 and a send button 326. The keyboard 322 can be a touch input keyboard, and for each input received at a particular location on the keyboard 322, corresponding character or text is displayed in a text in the message preview 324. The user in tap various keys of the keyboard 322 which appear as text in message preview 324. When the user finishes inputting a message into the message preview 324 via the keyboard 322, by providing an input at the send button 326, the text within the message preview 324 is transmitted from the electronic device to a recipient.

FIG. 3B illustrates the example electronic device 300 displaying a segmented message 320*b*. That is, FIG. 3B illustrates the example electronic device 300 displaying the message 320*a* of FIG. 3A, on the display 310, after the segmentor 230 segments the text input multiple selectable segments. In particular, in response to the segmentor 230 detecting a certain input with respect to the message 320*a*, the segmentor 230 segments the text and displays the multiple selectable segments of text as the segmented message 320*b* to the user. Segments 351-358, 360-369, 371, and 373-379 are single words, each word and formatting element such as a period and question-mark are included in individual selectable segments.

In contrast, segments 359, 370, and 372 are text that includes an identified structure that indicates that the words are to remain together. For example, segments 359 and 370 are a proper nouns and segment 372 is identified based on time formatting structure. In certain embodiments, the segmentor 230 identifies certain textual words that are to remain together and not separate. For example, the segmentor 230 identifies specific formatting such as a time, date, phone number, URL address, email address, geographical address, and the like. Based on the detected formatting associated with text, the segmentor 230 can identify text that is to remain together. In certain embodiments, the segmentor 230 can identify proper nouns and various terminology and phrases that indicate that the words that comprise the phrase should remain together and not be separated into individual segments. In certain embodiments, the segmentor 230 can determine whether a two or more consecutive words or punctuation are to be combined in a single selectable segment. When the segmentor 230 determines two or more consecutive words or punctuation are to be combined in a single selectable segment, the words and punctuation are joined and formed into a single selectable segment. Alternatively, when the segmentor 230 determines words and punctuation are to be in individual segments, the segmentor 230 creates individual segments size to contain each specific word or punctuation. The selectable segments are then displayed on the display 310 as illustrated in FIG. 3B.

FIG. 3C illustrates the example electronic device 300 displaying a segmented message 320*c*. In particular, FIG. 3C illustrates the example electronic device 300 displaying on the display 310 the segmented message 320B of FIG. 3B after the segmentor 230 receives a user input selecting certain segments. Based on the received input, the segmentor 230 can identify segments that are selected by the user. The received input selecting certain segments can select the segments in any order. In certain embodiments, the segmentor 230 can recall the order that the segments were selected, such that if the content is moved to a new location such as a copy and paste function, the segments are copied and pasted in the order the individual segments were selected. In certain embodiments, the segmentor 230 maintains the selected segments in the chronological order that the segments are displayed on the display 310, regardless of the order the segments are selected.

In certain embodiments, in response to the segmentor 230 detecting a certain input with respect to the message 320*b* the segmentor 230 can change the appearance of the individual segments indicating the user the selected segments. Segments 351-367, 371, and 373-377 are the same segments as depicted in FIG. 3B. Segments 368*a*, 369*a*, 370*a*, 372*a*, 378*a*, and 379*a* are non-consecutive segments that the segmentor 230 identified as selected based on a received user input.

In response to identifying the selected text based on a received user input, the segmentor 230 can suggest one or more operations to perform on the selected text. Example suggestions can be based on past user selections. In certain embodiments, the segmentor 230 can suggest the selected text to be copied, translated, searched via a web browser, shared with another program or with another electronic device, or the like. If the segmentor 230 identifies that the selected text includes a formatting criteria, then the segmentor 230 can suggest one or more content specific actions. For example, if the selected text includes a phone number, the segmentor 230 can suggest calling the phone number or storing the phone number as a contact. In another example, if the selected text includes a geographical address, the segmentor 230 can suggest storing the address as a contact or providing navigational directions from the location of the electronic device 300 to the selected geographical address. In another example, if the selected text includes a date the segmentor 230 can suggest creating a calendar event based on the selected date. In another example, if the selected text includes an email address the segmentor 230 can suggest drafting an email directed to the email address or storing the email address with a contact. In another example, if the selected text includes a URL address the segmentor 230 can suggest opening a web browser to open the web site.

Figure 4A:
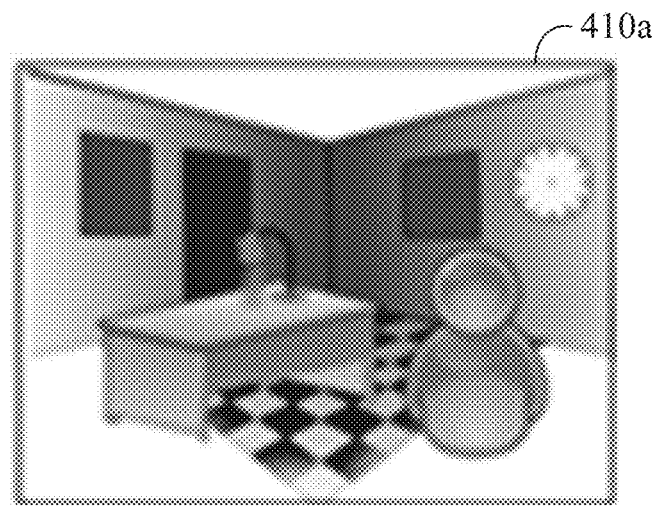
FIGS. 4A, 4B, and 4C illustrate an example diagrams for segmenting an image in accordance with an embodiment of this disclosure.
Figure 4B:
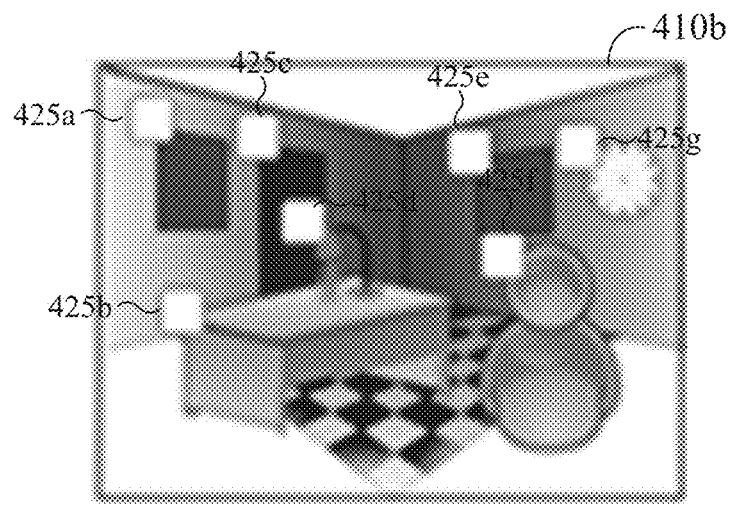
Figure 4C:
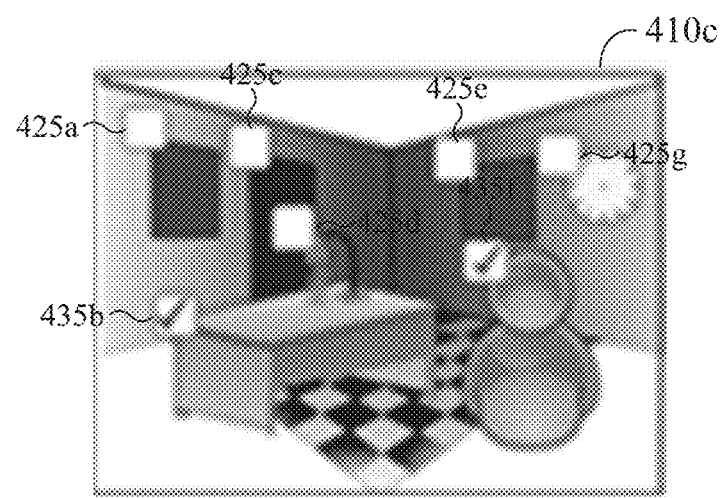

FIGS. 4A, 4B, and 4C illustrate an example diagrams for segmenting an image in accordance with an embodiment of this disclosure. The images 410*a*, 410*b*, and 410*c*, as illustrated in FIGS. 4A, 4B, and 4C, respectively, represent the same image. The images can be displayed on a display of the electronic device 200 and electronic device 300 with internal components similar to those of the electronic device 100 of FIG. 1. The embodiment as shown in FIGS. 4A, 4B, and 4C are for illustration only. Other embodiments can be used without departing from the scope of the present disclosure.

FIG. 4A illustrate image 410*a*. The image 410*a* can be stored in the memory, such as memory 160 of the FIG. 1, of an electronic device. The image 410*a* can be received in a message such as an SMS message, a multimedia messaging service (MMS), an email message, and the like. The image 410*a* can be an image that a camera captured. The image 410*a* can be an image viewed on a web page.

FIG. 4B illustrates the example a segmented image 410*b*. That is, FIG. 4B illustrates the image 410*a* of FIG. 4A, after the segmentor 230 segments the image multiple selectable objects. In particular, in response to the segmentor 230 detecting a certain input with respect to the image 410*a*, the segmentor 230 first identifies the type of content. When the segmentor identifies that the image 410*a* is an image, the segmentor 230 segments the image and displays the multiple selectable segments, such as objects, as the segmented image 410*b* to the user. The segmentor 230 can change the color of the object itself or create a ring around the object in order to distinguish the selectable object from the overall image 410*b*. The segmentor can include a selectable box in proximity to the selectable object. For example, each of the segmented objects included in image 410*b* are associate with selectable boxes 425*a*, 425*b*, 425*c*, 425*d*, 425*e*, 425*f*, and 425*g*.

In certain embodiments, the segmentor 230 identifies or distinguishes different objects within an image using object recognition. Object recognition includes computer vision that enable the segmentor 230 to identify one or more objects within the image. In certain embodiments, the segmentor 230 enables another component or device to perform the object recognition. Object recognition can distinguish one item from another item in the image without identifying the object itself. By distinguishing different objects within an image, the segmentor 230 can isolate each object allowing a user to select the individual objects.

In certain embodiments, the segmentor 230 identifies or distinguishes different objects within an image using border detection or edge detection. Edge detection can be performed by the segmentor 230 or another device or program that is associated with the electronic device. Edge detection can distinguish portions of an image where brightness of the image changes, a discontinuity is detected, or the like. Edge detection can be used to identify different depths within an image, changes in surface orientation, changes in material and surface properties of objects within an image, variation of the illumination within the scene. Based on the detected changes, individual objects or portions of objects can be distinguished. Thereafter, the segmentor 230 can identify the object as a selectable segment.

In certain embodiments, the segmentor 230 can identify objects within an image such as a picture based on metadata associated with the image. For example, if the image 410a is captured by a camera, metadata associated with the image can indicate the location, time, geographical location the image was captured as well as the aperture, focal length ISO, exposure time, and other parameters associated with capturing the picture. The metadata can indicate the focal object of the image based on where the focus of the image is, and distinguish that object as a selectable segment. In certain embodiments, the segmentor 230 can distinguish objects that are in proximity to or in a similar focal plane as the focal length of the image.

FIG. 4C illustrates the example segmented image 410c. In particular, FIG. 4C illustrates the segmented image 410B of FIG. 4B after the segmentor 230 receives a user input selecting certain objects. Based on the received input, the segmentor 230 can identify the segments that are selected by the user. For example, image 410c illustrates objects associated with selectable box 435b and 435f are selected while objects that are associated with selectable boxes 425a, 425c, 425d, 425e, and 425g remain unselected.

The received user input that selected certain segments can select the segments in any order. In certain embodiments, the segmentor 230 can recall the order that the objects were selected, such that if the content is moved to a new location such as a copy and paste function, the segments are copied and pasted in the order the individual segments were selected. In certain embodiments, the segmentor 230 maintains the selected segments in the order the segments are displayed to on the display 310 such as from right to left, up to down, and the like, regardless of the order the segments are selected.

In certain embodiments, in response to the segmentor 230 detecting a certain input with respect to the image 410b the segmentor 230 can cause a symbol that is associated with each object indicating that the object is selected by the user. For example, a mark such as a check can be included in the box that indicates a selectable object. The segmentor 230 can change how the object is represented on display such as changing the color of the object.

In response to identifying an object of the image 410c as selected based on a received user input, the segmentor 230 can suggest one or more operations to perform on the selected object. Example suggestions can be based on past user selections. In certain embodiments, the segmentor 230 can suggest to copy the selected objects, shared the selected objects with another electronic device, or the like. In certain embodiments, the segmentor 230 can suggest to convert the object into a sticker. In certain embodiments, the segmentor 230 can suggest each of the selected objects can be saved in their own individual image. In certain embodiments, the segmentor 230 can suggest to move the object into another image. In certain embodiments, the segmentor 230 can detect another input further modifying the boundary line of a selected object, such as increasing or decreasing the size of the boundary of the selected object or changing the shape of the boundary line around the object.

FIGS. 5A, 5B, 5C, and 5D illustrate an example diagrams for segmenting an image in accordance with an embodiment of this disclosure. The images 505a, 505b, and 505c (collectively image 505), as illustrated in FIGS. 5A, 5B, and 5C, respectively, represent the same image. The image 530 as illustrated in FIG. 5D represents an object from the image 505 superimposed into another image. The images 505 and 530 can be displayed on a display of the electronic device 200 and electronic device 300 with internal components similar to those of the electronic device 100 of FIG. 1. The embodiment of as shown in FIGS. 5A, 5B, 5C, and 5D are for illustration only. Other embodiments can be used without departing from the scope of the present disclosure.

FIG. 5A illustrate image 505a. The image 505a can be stored in the memory, such as memory 160 of the FIG. 1, of an electronic device. The image 505a can be received in a message such as an SMS message, a MMS message, an email message, and the like. The image 505a can be an image that a camera captured. The image 505a can be an image viewed on a web page. FIG. 5A also depicts hand 510 performing a gesture 510a on the display. The gesture 510a can be any type of gesture such as a palm swipe, a press and hold, a finger drag, a double tap, and the like. When the segmentor 230 receives the gesture 510a, the segmentor 240 identifies the type of content and then creates one or more selectable segments or objects.

FIG. 5B illustrates the example a segmented image 505b. That is, FIG. 5B illustrates the image 505a of FIG. 5A, after the segmentor 230 segments the image multiple selectable segments or objects. In particular, in response to the segmentor 230 detecting a certain input, such as the gesture 510a, with respect to the image 505a, the segmentor 230 first identifies the type of content. When the segmentor identifies that the displayed content is an image, the segmentor 230 segments the image 505 and displays the multiple selectable segments as the segmented image 505b to the user. In certain embodiments, the segmentor 230 can change the color of the object itself or create a ring around the object in order to distinguish the selectable object from the image. The segmentor can include a selectable box in proximity to the selectable object. For example, each of the segmented objects included in image 505b are associate with selectable boxes 515a, 515b and 515c.

FIG. 5C illustrates the example a segmented image 505c. In particular, FIG. 5C illustrates the segmented image 505B of FIG. 5B after the segmentor 230 receives a user input selecting a certain object. Based on the received input, the segmentor 230 can identify the segments that are selected by the user. For example, the segmentor 230 receives a user input selecting an object 520. The selected object 520 is the same as object 515c of FIG. 5B. Selectable boxes 515a and 515b remain unselected.

In certain embodiments, after a user selects at least one object, a set of suggested operation 525 can be displayed to the user. The suggested operation 525 can include a 'save' operation, which saves the one or more selected objects as a new file. The suggested operations 252 can include a 'add sticker' operation, which converts the selected object to a sticker. In certain embodiments, a sticker is an illustration that similar to an emoji or emoticons. For example, the object can be converted into a sticker that is saved on the electronic device for future use in an SMS message or the like. The suggested operations 252 can include a 'paste to' operation, which moves and superimposes the selected object over another image or picture.

FIG. 5D illustrates another image 530. In particular, FIG. 5D illustrates the selected object 520 of FIG. 5C as a superimposed image 535 on another image 530, after the segmentor 230 receives a user input to perform a 'paste to' operation. In certain embodiments, when the 'paste to' operation is selected, a user can select a particular image saved to the electronic device to superimpose the selected object 520 onto.

When the superimposed image 535 is presented on the image 530, the segmentor 230 can include a resize box 540 around the superimposed image 535. The resize box enables a user to resize the superimposed image 535. For example, the user can stretch or shrink the superimposed image 535 horizontally and vertically. In another example, the user can shrink and grow the superimposed image 535 while maintaining a ratio the dimensions (height and length) of the superimposed image 535.

In certain embodiments, after the superimposed image 535 is presented on the image 530, a second set of suggested operation 545 can be displayed to the user. The suggested operation 545 can be the same set of suggested operation 525 of FIG. 5C. In certain embodiments, the operation 545 includes one or more different operations that the operation 525 of FIG. 5C. The operation 545 can include a 'sticker' operation, which converts the image 530 to a sticker. The 'sticker' operation of is similar to the 'add sticker' operation of FIG. 5C. In certain embodiments, the 'sticker' operation of is different than the 'add sticker' operation of FIG. 5C. For example, the 'add sticker' operation of FIG. 5C creates a sticker of the selected object, whereas the 'sticker' operation of FIG. 5D creates a sticker of the entire image. The operation 545 can include a 'label' operation, which enables a user to input text onto the image 530. The operation 545 can include a 'draw' operation, which enables a user to draw on the image 530. The operation 545 can include a 'accept' and 'reject' operation, which enables a user to save the image as a new image or undo all modification to the image 530.

Figure 6A:
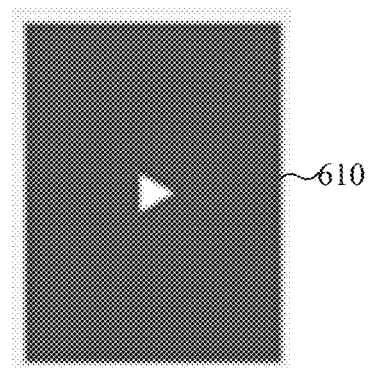
FIGS. 6A, 6B, and 6C illustrate an example diagrams for segmenting a video in accordance with an embodiment of this disclosure.
Figure 6B:
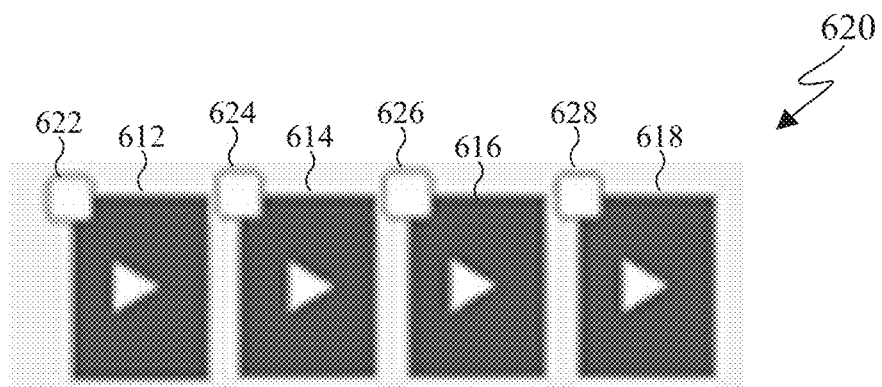
Figure 6C:
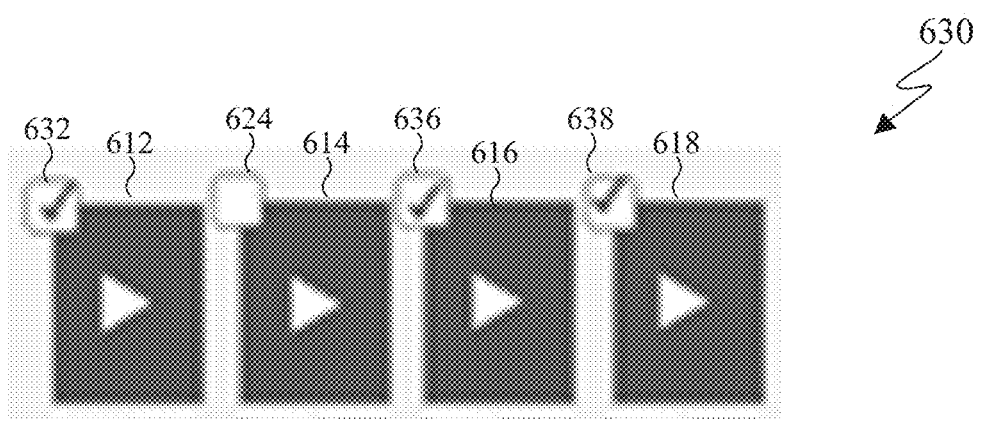

FIGS. 6A, 6B, and 6C illustrate an example diagrams for segmenting a video in accordance with an embodiment of this disclosure. The video of FIGS. 6A, 6B, and 6C can be played on the electronic device 200 and electronic device 300 with internal components similar to those of the electronic device 100 of FIG. 1. The embodiment as shown in FIGS. 6A, 6B, and 6C are for illustration only. Other embodiments can be used without departing from the scope of the present disclosure.

FIG. 6A illustrate video 610. The video 610 can be stored in the memory, such as memory 160 of the FIG. 1, of an electronic device. The video 610 can be received in a message, such as an SMS message, a multimedia messaging service (MMS) an email message, and the like. The video 610 can be a video that a camera captured. The video 610 can be an image viewed on a web page.

FIG. 6B illustrates the example a segmented video 620. That is, FIG. 6B illustrates the video 610 of FIG. 6A, after the segmentor 230 segments the video multiple selectable segments. In particular, in response to the segmentor 230 detecting a certain input with respect to the video 610, the segmentor 230 first identifies the type of content. When the segmentor identifies that the video 610 is a video, the segmentor 230 segments the video and displays the multiple selectable segments as the segmented video 620 to the user.

In certain embodiments, the segmentor 230 segments a video input multiple segments or clips. The segmented video clips can overlap one another or remain distinct. Additionally, portions of the video 610 can be skipped and not included in the video segments. For instance, the segmentor 230 can exclude portions of the video 610 that are blurry, out of focus, are blacked out (such as when the lens is covered), includes abrupt and sudden movement, such as when the camera shakes, and the like.

The segmentor 230 can create video segments based on detecting a scene chance within the video 610. For example, if the video 610 is capturing a person skateboarding, a scene can represent the elapsed time that a single trick is performed. In another example, a scene can be detected when the background scenery abruptly changes based on changes. The segmentor 230 can detect the background scenery abruptly changing when the brightness or color associated with a certain number of pixels change.

In certain embodiments, the segmentor 230 analyzes metadata associated with the video 610 to identify situations that would distinguish between scenes to create a selectable segment. For example, metadata can include a geographical location that the video was captured or a time stamp that a video was captured, or both. If the geographic location the video 610 was captured, changes to a new location, then a segment can be created, such that one segment includes a first location and another segment includes second location. If the geographic location gradually moves from one location to another, such that the location extends beyond a predetermined threshold, then a segment can be created as the geographic location reaches the threshold.

Each video segment 612, 614, 616, and 618 represent a portion of the video 610. In certain embodiments, when combined the video segments 612, 614, 616, and 618 are the entirety of the video 610. In certain embodiments, one of more of the video segments 612, 614, 616, and 618 can include overlapping frames. Each of the selectable video segments 612, 614, 616, and 618 include a selectable box 622, 624, 626, and 628, respectively. In certain embodiments, selectable boxes 622, 624, 626, and 628 are omitted and the video segments 612, 614, 616, and 618 can change color when a user input is received that selects one or more of the video segments.

In certain embodiments, the user can view the video segments 612, 614, 616, and 618. For example, a portion of each video segment can play when selected by a user. In another example, each of the video segments 612, 614, 616, and 618 can play on a loop certain frames of video segment indicating to the user the content of each frame. It is noted that the content within each video segment is in sequential order identical to the order the frames were presented in the video 610 of FIG. 6A.

FIG. 6C illustrates the example a segmented video 630. In particular, FIG. 6C illustrates the segmented video 620 of FIG. 6B after the segmentor 230 receives a user input selecting certain segments. Based on the received input, the segmentor 230 can identify the segments that are selected by the user. For example, the video 630 illustrates the video segments 612, 616 and 618 that are associated with the selectable box 632, 636, and 638 are selected, while the video segment 614 remains unselected.

The received input selecting certain video segments can select the video segments in any order. In certain embodiments, the segmentor 230 can recall the order that the video segments were selected, such that if the content is moved to a new location such as a copy and paste function, the video segments are combined in the order the individual segments were selected. For example, if the user selected video segment 616, 612, then 618, the segments are combined to create a new video in the order of 616, 612, and then 618. In certain embodiments, the segmentor 230 maintains the selected segments in the order the segments are presented within the video 610.

In response to identifying one or more segments of the video 610 as selected based on a received user input, the segmentor 230 can suggest one or more operations to perform on the selected video segments. Example suggestions can be based on past user selections. In certain embodiments, the segmentor 230 can suggest to copy the selected video segments, shared with another electronic device, or the like. In certain embodiments, the segmentor 230 can suggest to convert the selected video segments into a GIF. In certain embodiments, the segmentor 230 can suggest to create a new video that only includes the selected segments.

Figure 7:
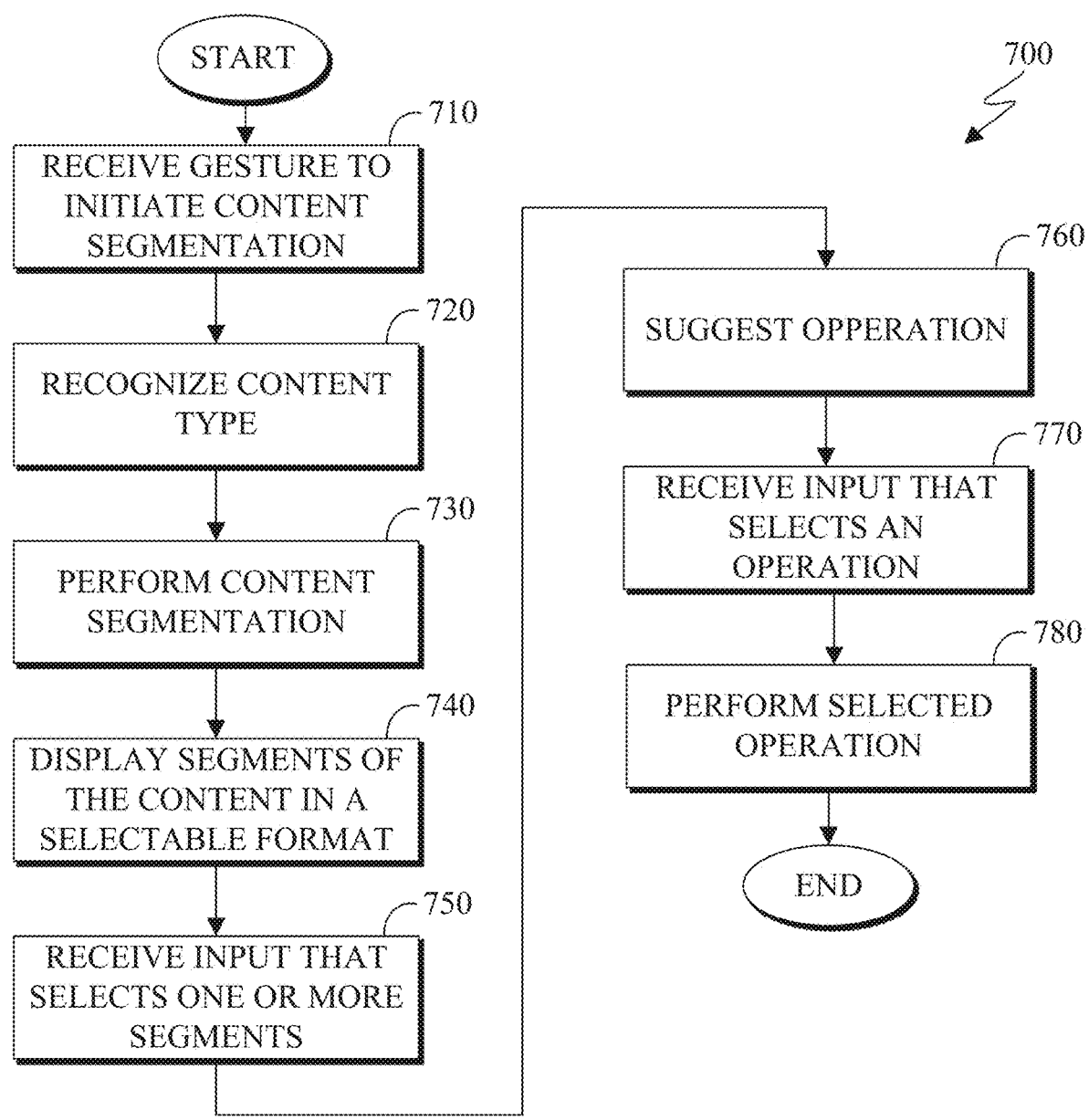
FIG. 7 illustrates an example method for operating an electronic device in accordance with an embodiment of this disclosure.

FIG. 7 illustrates an example method for operating an electronic device in accordance with an embodiment of this disclosure. For example, the process depicted in FIG. 7 is described as implemented by the electronic device 200 of FIG. 2, and the electronic device 300 of FIGS. 3A, 3B, 3C.

The process begins with the electronic device, such as electronic device 200 receiving a gesture to initiate context segmentation (710). In response to receiving a gesture to initiate context segmentation, the segmentor 230 of FIG. 2 recognizes the type (720). The content type can include text, an image, a video, a simulation, and the like.

The content is segmented based on the type of content (730). For example, if the content is text, individual words, and punctuation are included in multiple selectable segments. In certain embodiments, two or more words can be combined in a single selectable segments based on formatting and word class, such as a proper noun. In another example, if the content is an image, various objects within the image can be included as the multiple selectable segments. The objects can be identified or distinguished form the overall image based on object identification, boarder detection, metadata and the like. In another example, if the content is a video, various segments, or clips of the video can be included as the multiple selectable segments. Each video segment can be created based on a detected scene change or metadata. Additionally, video segments can be created to avoid portions of the video that are identified as blurry or out of focus.

In response to segmenting the content, each multiple selectable segments are displayed in a selectable format on a display of the electronic device (740). One or more inputs can be received selecting the displayed segments (750). It is noted that non-consecutive segments of content can be selected. When at least one segment is selected, the segmentor 230 can suggest one or more operations to perform with respect to the selected segment (760). In certain embodiments, the suggested operations can be one or more operations that are displayed based on the type of content. In certain embodiments, the suggested operations can be based on previous operations that are selected by the user.

An input can be received that selects a particular operation (770). Thereafter the operation with is performed with respect to the selected content. For example, if the selected operation indicates the content is to be copied, the content is copied. The content can then be pasted or moved to another location.

Figure 8:
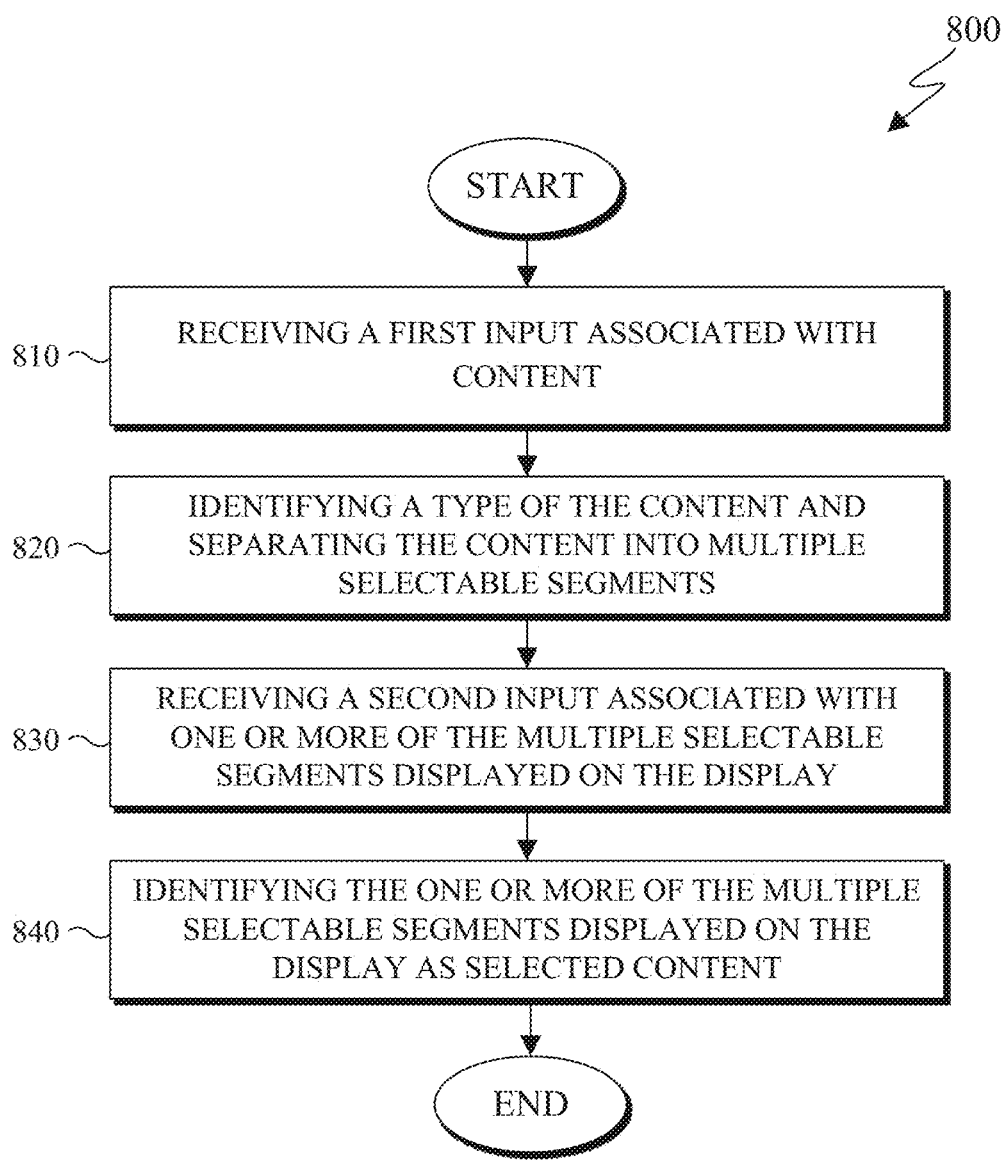
FIG. 8 illustrates an example method for operating an electronic device in accordance with an embodiment of this disclosure.

FIG. 8 illustrates an example method for operating an electronic device in accordance with an embodiment of this disclosure. For example, the process depicted in FIG. 8 is described as implemented by the electronic device 200 of FIG. 2, and the electronic device 300 of FIGS. 3A, 3B, 3C.

The process begins with the electronic device, such as electronic device 200 receiving a first input associated with content displayed on a display of the electronic device (810). The content can be can be displayed on the display (such as a text, image, or video) or indicated on the display such as audio. The first input indicates to the electronic device a request to initiate the segmentor 230 of FIG. 2.

In response to receiving the first input, the process then identifies a type of the content and separates the content into multiple selectable segments based on the identified content type (820). The content of text; an image; a video, or audio.

When the identified content type is text, the process separates the text into multiple selectable segments by identifying individual words of the text. The process can also determine whether two or more consecutive words of the text are to remain together based on predefined criteria. For example, if the text is a proper noun of two or more words, the each group of words is included in a single selectable segment. Similarly, if the text satisfies a predefined formatting criterion, such as a date, or time, the group of words and numbers are included in a single selectable segment. Thereafter the each individual word is placed in its selectable segments and each of the determined two or more consecutive words are grouped together in their own selectable segments.

When the identified content type is an image, the process separates the image into multiple selectable segments by identifying objects within the image. The process can separate the image into multiple selectable segments based on recognizing objects with the image such as through object recognition. Additionally, the process can separate the image into multiple selectable segments based on edge detection, received metadata, or both.

When the identified content type is a video, the process separates the video into multiple selectable segments by identifying different scenes of the video. The process can separate the video into multiple selectable segments based on detecting one or more scenes within the video. Additionally, the process can separate the video into multiple selectable segments based received metadata.

In certain embodiments, the process can receive metadata associated with the content. The electronic device can analyze the metadata to determine whether the metadata includes indicia of individual segments within the content. For example, the metadata of an image of video can indicate different focus points, geographic locations, time stamps aperture, white balance, and the like. Based on the different indicia that can be included in the metadata, the process can identify one or more segments to separate the content into.

The electronic device can then display the selectable segments on the display. The process can then receive a second input associated with one or more of the multiple selectable segments displayed on the display (830). Based on the received the second input, the process then identifies one or more segments as selected content (840). After one or more of the selectable segments are selected, the process determines one or more operations to perform on the selectable segments, based on the identified content type. In certain embodiments, the process displays a list of operations that are able to be performed on the selected segments based on the content type. In certain embodiments, the process determines specific operations to display based on previous user inputs. The process can receive a third input that indicates a selection of one of the operations. Thereafter, the process performs the selected operation with respect to the selected segments.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a display configured to display content; and
a processor operably connected to the display, wherein the processor is configured to:
receive a first input associated with the content displayed on the display of the electronic device;
in response to receiving the first input, identify a category of the content;
separate the content into multiple selectable segments based on the identified category of the content;
receive a second input selecting more than one of the multiple selectable segments displayed on the display; and
identify the more than one of the multiple selectable segments displayed on the display as selected content based on the received second input.

2. The electronic device of claim 1, wherein:
the identified category of the content is text; and
to separate the content into the multiple selectable segments, the processor is further configured to:
identify individual words of the text to segment the content into the multiple selectable segments,
determine whether two or more consecutive words of the text remain together based on predefined criteria, and
in response to determining that the two or more consecutive words of the text remain together, identify the two or more consecutive words as a single selectable segment and each of the individual words as a single selectable segment of the multiple selectable segments.

3. The electronic device of claim 1, wherein:
the identified category of the content is an image; and
to separate the content into the multiple selectable segments, the processor is further configured to:
identify one or more objects within the image, and
identify each of the one or more identified objects within the image as a single selectable segment of the multiple selectable segments.

4. The electronic device of claim 1, wherein:
the identified category of the content is a video; and
to separate the content into the multiple selectable segments, the processor is further configured to:
detect one or more scenes within the video, and
identify each of the one or more detected scenes of the video as a single selectable segment of the multiple selectable segments.

5. The electronic device of claim 1, wherein the processor is further configured to:
determine one or more operations to perform on the more than one of the multiple selectable segments based on the identified category of the content;
display the one or more operations to perform;
receive a third input selecting one operation of the one or more operations; and
in response to receiving the third input, perform the selected operation to the selected content.

6. The electronic device of claim 1, wherein the processor is further configured to:
receive metadata associated with the content;
analyze the received metadata to determine whether the metadata includes indicia of individual segments within the content; and
in response to determining that the metadata includes the indicia of the individual segments, separate the content into the multiple selectable segments, wherein one or more of the multiple selectable segments are based on the indicia of the individual segments.

7. The electronic device of claim 1, wherein the identified category of the content includes at least one of text; an image; a video; or a representation of audio.

8. A method for operating an electronic device, the method comprising:
receiving a first input associated with content displayed on a display of the electronic device;
in response to receiving the first input, identifying a category of the content;
separating the content into multiple selectable segments based on the identified category of the content;
receiving a second input selecting more than one of the multiple selectable segments displayed on the display; and
identifying the more than one of the multiple selectable segments displayed on the display as selected content based on the received second input.

9. The method of claim 8, wherein:
the identified category of the content is text; and
separating the content into the multiple selectable segments comprises:
identifying individual words of the text to segment the content into the multiple selectable segments,
determining whether two or more consecutive words of the text remain together based on predefined criteria, and
in response to determining that the two or more consecutive words of the text remain together, identifying the two or more consecutive words as a single selectable segment and each of the individual words as a single selectable segment of the multiple selectable segments.

10. The method of claim 8, wherein:
the identified category of the content is an image; and
separating the content into the multiple selectable segments comprises:
   identifying one or more objects within the image, and
   identifying each of the one or more identified objects within the image as a single selectable segment of the multiple selectable segments.

11. The method of claim 8, wherein:
the identified category of the content is a video; and
separating the content into the multiple selectable segments comprises:
   detecting one or more scenes within the video, and
   identifying each of the one or more detected scenes of the video as a single selectable segment of the multiple selectable segments.

12. The method of claim 8, further comprising:
determining one or more operations to perform on the more than one of the multiple selectable segments based on the identified category of the content;
displaying the one or more operations to perform;
receiving a third input selecting one operation of the one or more operations; and
in response to receiving the third input, performing the selected operation to the selected content.

13. The method of claim 8, further comprising:
receiving metadata associated with the content;
analyzing the received metadata to determine whether the metadata includes indicia of individual segments within the content; and
in response to determining that the metadata includes the indicia of the individual segments, separating the content into the multiple selectable segments, wherein one or more of the multiple selectable segments are based on the indicia of the individual segments.

14. The method of claim 8, wherein the identified category of the content includes at least one of text; an image; a video; or a representation of audio.

15. A non-transitory computer readable medium embodying a computer program, the computer program comprising computer readable program code that, when executed by a processor of an electronic device, causes the processor to:
   receive a first input associated with content displayed on a display of the electronic device;
   in response to receiving the first input, identify a category of the content;
   separate the content into multiple selectable segments based on the identified category of the content;
   receive a second input selecting a more than one of the multiple selectable segments displayed on the display; and
   identify the more than one of the multiple selectable segments displayed on the display as selected content based on the received second input.

16. The non-transitory computer readable medium of claim 15, wherein:
the identified category of the content is text; and
to separate the content into the multiple selectable segments, the computer readable program code when executed by the processor further causes the processor to:
   identify individual words of the text to segment the content into the multiple selectable segments,
   determine whether two or more consecutive words of the text remain together based on predefined criteria, and
   in response to determining that the two or more consecutive words of the text remain together, identify the two or more consecutive words as a single selectable segment and each of the individual words as a single selectable segment of the multiple selectable segments.

17. The non-transitory computer readable medium of claim 15, wherein:
the identified category of the content is an image; and
to separate the content into the multiple selectable segments, the computer readable program code when executed by the processor further causes the processor to:
   identify one or more objects within the image, and
   identify each of the one or more identified objects within the image as a single selectable segment of the multiple selectable segments.

18. The non-transitory computer readable medium of claim 15, wherein:
the identified category of the content is a video; and
to separate the content into the multiple selectable segments, the computer readable program code when executed by the processor further causes the processor to:
   detect one or more scenes within the video, and
   identify each of the one or more detected scenes of the video as a single selectable segment of the multiple selectable segments.

19. The non-transitory computer readable medium of claim 15, wherein the computer readable program code when executed by the processor further causes the processor to:
   determine one or more operations to perform on the more than one of the multiple selectable segments based on the identified category of the content;
   display the one or more operations to perform;
   receive a third input selecting one operation of the one or more operations; and
   in response to receiving the third input, perform the selected operation to the selected content.

20. The non-transitory computer readable medium of claim 15, wherein the computer readable program code when executed by the processor further causes the processor to:
   receive metadata associated with the content;
   analyze the received metadata to determine whether the metadata includes indicia of individual segments within the content; and
   in response to determining that the metadata includes the indicia of the individual segments, separate the content into the multiple selectable segments, wherein one or more of the multiple selectable segments are based on the indicia of the individual segments.

* * * * *